US007235297B2

(12) United States Patent
Côté

(10) Patent No.: US 7,235,297 B2
(45) Date of Patent: Jun. 26, 2007

(54) AMPHIPHILE SOLID SUPPORT FOR PEPTIDE SYNTHESIS, BIOORGANIC AND ORGANIC CHEMISTRY

(75) Inventor: Simon Côté, Québec (CA)

(73) Assignee: Matrix Innovation Inc., Montreal, Quebec (CA)

(*) Notice: Subject to any disclaimer, the term of this patent is extended or adjusted under 35 U.S.C. 154(b) by 332 days.

(21) Appl. No.: 10/416,499

(22) PCT Filed: Nov. 20, 2001

(86) PCT No.: PCT/CA01/01625

§ 371 (c)(1),
(2), (4) Date: Sep. 22, 2003

(87) PCT Pub. No.: WO02/40559

PCT Pub. Date: May 23, 2002

(65) Prior Publication Data

US 2004/0039126 A1    Feb. 26, 2004

Related U.S. Application Data

(60) Provisional application No. 60/249,442, filed on Nov. 20, 2000.

(51) Int. Cl.
*B32B 15/02*    (2006.01)
(52) U.S. Cl. .................. 428/402; 428/482; 525/329.7; 525/329.8; 525/329.9; 525/330.1; 525/332.2; 525/437; 525/438; 424/489
(58) Field of Classification Search ............... 428/402, 428/482; 525/329.7, 329.8, 329.9, 330.1, 525/330.2, 332.2, 437, 438, 445; 424/489
See application file for complete search history.

(56) References Cited

U.S. PATENT DOCUMENTS

| 4,873,299 | A | * | 10/1989 | Nowakowsky et al. ....... 526/73 |
| 4,908,405 | A | | 3/1990 | Bayer et al. |
| 5,352,756 | A | | 10/1994 | Meldal |
| 5,385,729 | A | * | 1/1995 | Prencipe et al. ......... 424/70.11 |
| 5,466,758 | A | | 11/1995 | Yoon-Sik et al. |
| 5,837,789 | A | | 11/1998 | Stockhausen et al. |
| 5,910,554 | A | | 6/1999 | Kempe et al. |
| 6,211,296 | B1 | * | 4/2001 | Frate et al. .................. 525/207 |
| 6,218,440 | B1 | * | 4/2001 | Kitagawa ..................... 521/56 |
| 6,933,328 | B2 | * | 8/2005 | Schacht ....................... 523/115 |

FOREIGN PATENT DOCUMENTS

| EP | 0 780 411 | 6/1997 |
| JP | 60147419 | 8/1985 |
| WO | WO 97/27226 | 7/1997 |
| WO | WO 00/18823 | 4/2000 |

OTHER PUBLICATIONS

Annunziata et al., "Poly(ethylene glycol)-Supported Bisoxazolines as Ligands for Catalytic Enantioselective Synthesis", Org. Chem., 2001, pp. 3160-3166, vol. 66.
Arshady et al., "Peptide Synthesis. Part 1. Preparation and Use of Polar Supports based on Poly(dimethylacrylamide)", J.C.S. Perkin I, 1981, pp. 529-537.
Atherton et al., "A Physically Supported Gel Polymer for Low Pressure, Continuous Flow Solid Phase Reactions. Application to Solid Phase Peptide Synthesis", J.S.C. Chem. Comm., 1981, pp. 1151-1152.
Bayer, "Towards the Chemical Synthesis of Proteins", Angew. Chem. Int. Ed. Engl, 1991, pp. 113-129, vol. 30 No. 2.
Bevington et al., "The effects of allyl ethers upon radical polymerizations", J. Macromol. Sci. - Pure Appl. Chem., 2001, pp. 627-640, vol. A38(7).
Buchardt et al., "A Chemically Inert Hydrophilic Resin for Solid Phase Organic Synthesis", Tetrehedron Letters, 1998, pp. 8695-8698, 39.
Groth et al., "HYDRA : A novel hydroxy and amine functionalised resin synthesised by reductive amination of PEG aldehyde and a polyamine", J. Chem. Soc., Perkin Trans. 1, 2000, pp. 4258-4264.
Hendrana et al., "Copolymerization of methyl methacrylate and allyl acetate Part 1. Rate of reaction", Polymer International, 2001, pp. 597-605, vol. 50.
Hellermann et al., "Poly(ethylene glycol)s Grafted onto Crosslinked Polystyrenes, 2[a]", Makromol. Chem., 1983, pp. 2603-2617, vol. 184.
Toy et al., "New supports for solid-phase organic synthesis: development of polystyrene resins containing tetrahydrofuran derived cross-linkers", Tetrahedron Letters, 1999, pp. 6329-6332, vol. 40.
Kanda et al., "Synthesis of polyamide supports for use in peptide synthesis and as peptide-resin conjugates for antibody production", Int. J. Peptide Protein Res., 1991, pp. 385-391, vol. 38.
Kempe et al., "CLEAR: A Novel Family of Highly Cross-Linked Polymeric Supports for Solid-Phase Peptide Synthesis[1,2]", Am. Chem. Soc., 1996, pp. 7083-7093, vol. 118.
Meldal, "PEGA: a flow stable polyethylene glycol dimethyl acrylamide copolymer for solid phase synthesis", Tetrahedron Letters, 1992, pp. 3077-3080, vol. 33.

(Continued)

*Primary Examiner*—Terressa Boykin
(74) *Attorney, Agent, or Firm*—Buchanan Ingersoll & Rooney PC

(57) ABSTRACT

The present invention fulfils desired specifications generally rarely encountered with existing solid supports such as highly amphiphile behaviour. The solid support described herein is a poly(ethylene or propylene)glycol based polymer that can be useful in solid and liquid phase synthesis, chromatography, scavenging purposes and immobilisation of proteins and reagents. More specifically, the solid support is a cross-linked polyether derived from a cross-linked polyester which is obtained by copolymerization of at least one monomer comprising (a) one-ended polymerizable vinyl or allyl ketone, ester, ether or mixtures thereof with at least one cross-linker having at least two polymerizable terminal end groups, with the exception of epoxy and oxetane end groups, or (b) divinyl benzene. The method for the preparation of the cross-linked polyether is also disclosed.

14 Claims, No Drawings

OTHER PUBLICATIONS

Meldal, "Properties of solid supports", Methods in Enzymology, 1997, pp. 83-105, vol. 289.

Merrifield, "Solid Phase Peptide Synthesis. I. The Synthesis of a Tetrapeptide", J. Am. Chem. Soc., 1963, pp. 2149-2154, vol. 85.

Milstein, "Friedel Crafts Reactions of Three-Members Heterocycles II. Alkylation of Aromatic Compounds with Aziridines", J. Heterocycl. Chem, 1968, pp. 339-341, vol. 5.

Moustafa et al., "Synthesis and Characterization of Highly Porous Poly(methacrylic-co-triethylene glycol dimethacrylate) by suspension Polymerization", J. Applied Polymer Science, 1999, pp. 149-159, vol. 73.

Mutter et al., "New Method of Polypeptide Synthesis", Angew. Chem. Int. Ed., 1971, pp. 811-812, vol. 10 No. 11.

Nakajima et al., "Stereospecific alkylation of benzene with (+)-propylene oxide by lewis acid catalyst and sterochemistry of ring-opening[1,2]", Tetrahedron, 1969, pp. 1807-1816, vol. 25.

Park et al., "Convenient Method for Preparing Polystyrene having β-Hydroxy Group : Its Application to the Synthesis of Polyethylene Glycol-Grafted Polystyrene Resin", Tetrahedron Letters, 1997, pp. 591-594, vol. 38 No. 4.

Rademann et al., "SPOCC: A Resin for Solid-Phase Organic Chemistry and Enzymatic Reactions on Solid Phase", J. Am. Chem. Soc., 1999, pp. 5459-5466, vol. 121.

Renil et al., "Gel-Phase Peptide Synthesis on a New High-Capacity Tetraethyleneglycol Diacrylate-Crosslinked Polystyrene Support: Synthesis of Pardaxin 16-33", Tetrahedron, 1994, pp. 6681-6688, vol. 50 No. 22.

Renil et al., "Synthesis and Application of a PEGA Polymeric Support for High Capacity Continuous Flow Solid-Phase Peptide Synthesis", Tetrahedron Letters, 1995, pp. 4647-4650, vol. 36.

Renil et al., "POEPOP and POEPS: Inert Polyethylene Glycol Crosslinked Polyneric Supports for Solid Synthesis", Tetrahedron Letters, 1996, pp. 6185-6188, vol. 37 No. 34.

Roice et al., "Synthesis, Characterization, and application of Butanediol Dimethacrylate Cross-Linked Polystyrene: A Flexible Support for Gel Phase Peptide Synthesis", Macromolecules, 1999, pp. 8807-8815, vol. 32.

Small et al., "Design and Application of a New Rigid Support for High Efficiency Continuous-Flow Peptide Synthesis", J. Chem. Soc. Chem. Commun., 1989, pp. 1589-1591, vol. 21.

Tuncel, "Suspension polymerization of poly(ethylene glycol) methacrylate: a route for swellable spherical gel beads with controlled hydrophilicity and functionality", Colloid Polym. Sci., 2000, pp. 1126-1138, vol. 278.

Varkey et al., "Synthesis of thioredoxin partial sequences on 1,6-hexanediol diacrylate (HDODA)-cross-linked polystyrene resin", J. Peptide Res., 1998, pp. 49-54, vol. 51.

Wentworth et al., "Liquid-phase chemistry: recent advances in soluble polymer-supported catalysts, reagents and synthesis", Chem. Commun., 1999, pp. 1917-1924.

Wilson et al., "Solvent and Reagent Accessibility within Oligo(ethylene glycol) ether [PEG] Cross-Linked Polystyrene Beads", J. Org. Chem., 1998, pp. 5094-5099, vol. 63.

Zalipsky et al., "Preparation and applications of polyethylene glycol-polystyrene graft resin supports for solid-phase peptide synthesis", reactive Polymers, 1994, pp. 243-258, vol. 22.

* cited by examiner

AMPHIPHILE SOLID SUPPORT FOR PEPTIDE SYNTHESIS, BIOORGANIC AND ORGANIC CHEMISTRY

TECHNICAL FIELD

This invention relates to a polymeric support for use in peptide synthesis, and in the field of bioorganic and organic chemistry. The invention also relates to a method of preparation thereof as well as to intermediates which can be used in such preparation. More particularly, the invention relates to a polyethylene or polypropylene glycol based polymer which can be used in the form of solid support in solid and liquid phase synthesis, chromatography, for scavenging purposes and immobilization of proteins and reagents.

BACKGROUND ART

Since the pioneering work of Merrifield (Merrifield, R. B. (1963), J. Am. Chem. Soc., 85, 2149–2153) on polystyrene (2% divinylbenzene cross-linked) as solid support for peptide synthesis, several improvements on the nature of the solid support were brought about to meet special needs of new organic chemistry. Through the years, most of the work done in that field has been focused on peptide synthesis.

Several polyamide resins (Kanda et al., (1991), Int. J. Peptide Protein Res., 38, 385–391) for solid phase peptide synthesis have been developed since the '80. The amide bonds of the polymer are the same as those found in peptides. Consequently, peptide chemistry can be performed in a polarity environment which is similar to that of peptides and that improves chemical yields and peptide purity. PEPSYN (Arshady et al., (1981), J. Chem. Soc. Perkin Trans., 529–537), PEPSYN K (Atherton et al., (1981), J. Chem. Soc. Chem. Commun., 1151–1152), and Polyhipe (Small et al., (1989), J. Chem Soc. Chem Commun., 1589–1591), can be mentioned as other types of solid supports for peptide chemistry which were developed during the period 1981–1989.

The first (and probably the most famous) polystyrene-PEG (polyethylene glycol) hybrid resin is the one developed by Bayer known as the TentaGel® and disclosed in U.S. Pat. No. 4,908,405 and in Bayer E. (1991), Angew. Chem. Int. Ed. Engl. 30, 113–129. The matrix is made by coupling tetraethylene glycol (TTEG) with chloromethylated polystyrene. A high molecular weight PEG is then introduced into the polymer by reacting ethylene oxide with the potassium salt of PS-TTEG polystyrene-TTEG). That method has been proposed to give higher yields as a result of the further reaction with ethylene oxide. This polymer offers a good compromise between the mechanical properties of polystyrene and desired amphiphile behaviour with good swelling. The Bayer Patent also includes the use of cross-linked acrylates and methacrylates which are functionalized with hydroxy groups, hydroxypolystyrene and polyvinyl alcohol as starting materials. In this manner, it is possible to obtain (with ester bonds attached to the polymer), benzylic and secondary ethers. One of the drawbacks of that method is the possible cross-linking of TTEG (under basic conditions) between two chloromethylated benzene rings of the polymer network.

Meldal in Tetrahedron Lett., 33, 3077–3080 (1992) and in U.S. Pat. No. 5,352,756, as well as Renil et al., in Tetrahedron Lett, 36, 4647–4650, (1995) proposed a new polar matrix called PEGA. That polymer contains PEG or PPG (long chains) cross-linker bearing acrylamide moieties which are copolymerized with other methacrylic derivatives. Some of them are used as linkers for solid phase synthesis purposes. The choice of long chain PEG or PPG permits the passage of peptidic molecules through its network. The amide bonds found in that polymer are appropriate for solid phase peptidic synthesis.

Lee, in U.S. Pat. No. 5,466,758 and Park et al., (1997), Tetrahedron Lett., 38, 591–594 demonstrated the versatility of a process for the production of polystyrenes having a β-hydroxy group and polyglycol-grafted thereon. Based on the work of and Milstein (Milstein, N. (1968), J. Heterocycl. Chem., 5, 337–338) and Suga (Nakajima et al., (1969), Tetrahedron Lett., 38, 591–594 and citations therein), it is known to submit propylene oxide to Friedel-Crafts reactions with benzene and other aromatic compounds to give such β-hydroxy groups. Once the hydroxylated polystyrene is sythesized, the later reacts with ethylene oxide under basic conditions to give a PEG-polystyrene with various loading of terminal hydroxy groups. Lee established the stability of his new PEG-polystyrene matrix by several acidic treatments encountered in peptidic chemistry without any degradation, while conventional TentaGel® is degraded.

ArgGel® (Labadie et al., WO 97/27226, 1996) was developed during the same time. This Merrifield based resin has a better stability than its predecessor. Indeed, no benzyl ethers are present in the matrix through the use of a malonate derivative linked to the benzylic position. Subsequently, the diester is reduced to a diol and polymerized with ethylene oxide to give a stable PEG-polystyrene matrix.

Barany (Kempe et al., (1996) J. Am. Chem. Soc. 118, 7083–7093, and U.S. Pat. No. 5,910,554 refers to a highly cross-linked polymeric support called CLEAR® which is based on the copolymerization of tertiary cross-linkers containing polyethylene glycol (PEG) or polypropylene glycol (PPG) with several vinyl and allyl derivatives. The main application of that solid support is in the field of peptide synthesis. In the normal peptide chemistry conditions encountered, the integrity of the matrix is preserved. On the other hand, Tuncel, in Colloid Polym. Sci., 278, 1126–1138 (2000) described the synthesis of such swellable matrix based on PEG methacrylates, said matrix having a controlled hydrophilicity and functionnality.

Meldal has released two different approaches, as discussed below, to reach a backbone made from primary and/or secondary ether bonds with alcohol residues on which organic chemistry can be performed.

POEPOP (polyoxyethylene-polyoxypropylene) Renil et al., (1996), Tetrahydron Lett., 37, 6185 –6188) is made from epichlorohydrin and polyethylene glycol (PEG) to produce an epoxy material. The latter product is then polymerized with potassium t-butoxide. By a simple adjustment of the amount of epoxy residues on the original PEG 1500, a polymer is formed with a definite amount of alcohol to be derivatized. In that feature, a mixture of secondary and primary ether bond are formed with strong chemical resistance and good physical properties.

SPOCC (solid phase organic and combinatorial chemistry) (Rademann et al., (1999), J. Am. Chem. Soc., 121, 5459–5466 and Meldal et al., (2000), WO 00/18823) bas been proposed to obtain a backbone with ether bonds exclusively. In the same way, the polymer is formed of a high molecular weight PEG, but with oxetane end groups. The final product is obtained by a cationic ring-opening polymerization with $BF_3Et_2O$ in a silicon oil media. The major advantage of that matrix is its chemical stability from its primary ether bonds that has never been reached up to this day.

POEPOP and SPOCC are manufactured under expensive conditions (silicon oil) to obtain standard beaded polymer making its commercial production non attractive as conventional on polymerization methods with vinyl derivatives.

Bayer (Mutter et al., (1971), Angew. Chem., 83, 883; Angew. Chem. Int. Ed. Engl. 12, 811 (1971)) introduced the concept of liquid-phase chemistry where a high molecular weight PEG (one end optionally capped) is functionnalized to directly perform peptide chemistry thereon. This low cost product has the advantage of being compatible with practically all solvents used in organic chemistry except diethyl ether. The latter is used as the precipitation media which permit the filtration of the PEG resin at the end of the synthesis. The fact that PEG is solubilized in the reaction media ensures the accessibility of the reagents dissolved in the solvent to the reactive functionalities which are present on the polymer. Unfortunately, when ethers ($Et_2O$ or MTBE methyl tert-butyl ether) or alcohols (EtOH or cold i-PrOH) are used to precipitate the polymer, some impurities in the reaction mixture can also be precipitated. Even considering the low cost of PEG resins, that feature considerably reduces the attractiveness of the linear PEG family in solid phase peptide chemistry. This approach had been well documented during the 70' and 80'. Janda (Wenworth et al., (1999, Chem. Comm., 1917–1924) and many others (Annunziata et al., (2001), J. Org. Chem., 66, 3160–3166 and citations therein) pursue this idea since.

In a different approach, Janda used several styrenic-etheral crosslinked agents which are copolymerized with styrene (Janda et al., (1999), Tetrahedron Lett., 40, 6329). These crosslinked agents obtained from polytetrahydrofuran and 4-chloromethylstyrene or 4-hydroxystyrene, provide alternatives for divinylbenzene. Janda obtained good polymers with impressive swelling properties. This work showed how polystyrene can be upgraded with a little tuning of the crosslinked agent. Even though ether bonds are introduced in the polymer network, the hydrophobicity of styrene is still present.

Meldal (Renil et al., (1996), Tetrahedron Lett., 37, 6185–6188) used high molecular weight ($M_w$ 1500) PEG for the same experience with 4-chloromethylstyrene and 3-chloropropylstyrene (Buchardt et al., (1998); Tetrahedron Lett., 39, 8695–8698; Meldal et al., (2000), WO 00/18823). Wilson (Wilson et al., (1998), J. Org. Chem., 63, 5094–5099) employed shorter PEGs with 4-chloromethylstyrene (from ethylene to hexaethylene glycol) to obtain different polymers.

Roice (Roice et al. (1999), Macromol., 32, 8807–8815) proposed a butanediol dimethacrylate—styrene flexible copolymer for solid phase peptide synthesis. Under normal reaction conditions, no degradation had been observed. Unfortunately, esters residues are susceptible to degradation in strong acidic and basic conditions that can be encountered in organic chemistry. Other PEG-PS copolymers containing ester residues have been made in a similar way by using different monomers such as tetraethylene glycol and hexanediol diacrylates (Hellerman et al., (1983), Makrom. Chem., 184, 2603; Renil et al., (1994), Tetrahedron, 50, 6681; Zalipsky et al., (1994), React. Polym., 22, 243; Varkey et al., (1998), J. Peptide Res., 51, 49).

Meldal (Groth et al., (2000), WO 00/18823) proposed a new PEG based polymer named HYDRA. The polymer is cross-linked with tris (2-aminoethyl)amine on the PEG-aldehyde derivative via a reductive amination optionally containing hydroxyl functionalities. The residual amines or alcohols are therefore useful for anchoring several types of linkers. Unfortunately, the making of the polymer in a beaded form is impossible.

Other useful references on many other solid supports are available elsewhere (Meldal et al., (1997), Methods in Enzymology, 289, 83–104, Academic Press, N.Y.).

It is an object of the present invention to provide a new family of polymeric solid supports based on a polyethylene glycol or polypropylene glycol matrix.

It is another object of the present invention to provide a method for the synthesis of such polymeric solid supports.

It is another object of the present invention to provide polymeric solid supports that can be used for the solid phase synthesis of peptides, oligonucleotides, oligosaccharides and in combinational and traditional organic chemistry.

It is another object of the present invention to provide resins that can be used in liquid phase synthesis, chromatography, for scavenging purposes, and for protein and reagents immobilization.

It is another object of the present invention to provide a polymeric matrix based on the copolymerization of a polyethylene glycol or polypropylene secondary and/or tertiary cross-linkers having vinyl ketone, diallyl ether or divinyl ether terminal end groups, or of divinyl benzene, with acrylic, or methacrylic, such as maleic or itaconic monomers.

DISCLOSURE OF INVENTION

The present invention relates to a cross-linked polyether derived from a cross-linked polyester which is obtained by copolymerization of at least one monomer comprising a one-ended polymerizable vinyl or allyl ketone, ester, ether or mixtures thereof with (a) at least one cross-linker having at least two polymerizable terminal end groups, with the exception of epoxy and oxetane end groups, or (b) divinyl benzene.

In accordance with a preferred embodiment, the monomer is a polymerizable compound having the general formula

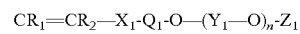

wherein
- $R_1$ represents H,H; H, alkyl; H, aryl; H, aralkyl; alkyl, alkyl; alkyl, aryl; alkyl, aralkyl; aryl, aryl; aryl, aralkyl; or aralkyl, aralkyl;
- $R_2$ represents H, alkyl, aryl, or aralkyl;
- $X_1$ represents alkyl, aryl, aralkyl, or CHOH in which the OH group is optionally protected;
- $Q_1$ represents nothing, C=O, alkyl, aryl, or aralkyl;
- $Y_1$ represents $CH_2$—$CH_2$; $CH_2$—$CH_2$—$CH_2$; $CH_2$—CH($CH_3$)—; or —CH($CH_3$)—$CH_2$—;
- $Z_1$ represents H, alkyl, aryl, aralkyl, glycidyl or an alcohol protecting group;
- n represents 0 or an integer from 1 to 2000.

It may be a derivative of an acrylic, methacrylic, maleic and/or itaconic acid.

The cross-linker preferably comprises a PEG or PPG based polymer. For example, it may be a secondary cross-linker of the general formula

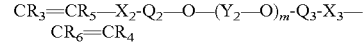

wherein
- $R_3$ and $R_4$ independently represent H,H; H, alkyl; H, aryl; H, aralkyl; alkyl, alkyl; alkyl, aryl; alkyl, aralkyl; aryl, aryl; aryl, aralkyl; aralkyl, aralkyl;

$R_5$ and $R_6$ independently represent H, alkyl, aryl, or aralkyl;

$X_2$ and $X_3$ independently represent nothing, alkyl, aryl, aralkyl or CHOH in which the OH group is optionally protected;

$Q_2$ and $Q_3$ independently represent nothing, C=O, alkyl, aryl, or aralkyl;

$Y_2$ represents $CH_2$—$CH_2$; $CH_2$—$CH_2$—$CH_2$; $CH_2$—CH($CH_3$)—; or —CH($CH_3$)—$CH_2$—;

m is 0 or an integer from 1 to 2000.

It may also be a tertiary cross-linker of the general formula

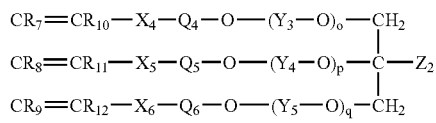

where $R_7$, $R_8$ and $R_9$ independently represent H,H; H, alkyl; H, aryl; H, aralkyl; alkyl, alkyl; alkyl, aryl; alkyl, aralkyl; aryl, aryl; aryl, aralkyl; aralkyl, aralkyl;

$R_{10}$, $R_{11}$ and $R_{12}$ independently represent H, alkyl, aryl, or aralkyl;

$X_4$, $X_5$ and $X_6$ independently represent nothing, alkyl, aryl, aralkyl or CHOH in which the OH group is optionally protected;

$Q_4$, $Q_5$, $Q_6$ independently represent nothing C=O, alkyl, aryl, or aralkyl;

$Y_3$, $Y_4$ and $Y_5$ independently represent $CH_2$—$CH_2$; $CH_2$—$CH_2$—$CH_2$; $CH_2$—CH($CH_3$)—; or CH($CH_3$)—$CH_2$—;

o, p and q independently represent 0 or an integer from 1 to 2000;

$Z_2$ represent H, alkyl, aryl, aralkyl, glycidyl or an alcohol protecting group.

For example the cross-linker may be a PEG diallyl ether or a PEG divinyl ether.

The invention also relates to a method for the preparation of the above cross-linked polyether, which comprises copolymerizing at least one monomer comprising a one-ended polymerizable vinyl or allyl ketone, ester, ether or mixtures thereof with (a) at least one cross-linker having at least two polymerizable terminal end groups, with the exception of epoxy and oxetane end groups, or (b) divinyl benzene to produce a cross-linked polyester, and converting said polyester into a cross-linked polyether.

In accordance with a preferred embodiment, the method according to the invention comprises (a) copolymerizing the above polymerizable compound with a compound selected from the above secondary cross-linker, the above tertiary cross-linker or divinyl benzene to give the above polyester, (b) reducing the polyester to give a polyol resin, and (c) reacting the polyol resin with a cyclic ether or a cyclic amine to give desired cross-linked polyether. The method may comprise treating the polyol by homologation to give said cross-linked polyether.

As used in the present description, the term homologation means the addition of recurring units to the polyol.

The polymeric polyester matrix is preferably based on the copolymerization of acrylic, methacrylic, maleic and/or itaconic acid derivatives monomers with PEG (or PPG) secondary and/or tertiary crosslinkers having the following terminal end groups: vinyl ketones to be later reduced to ether in their polymeric form, diallyl ethers, or divinyl ethers or a mixture thereof (Bevington et al., 2001 and Hendrana et al., 2001 cf supra). It is noteworthy that divinylbenzene can also be used as cross-linker in the present invention as illustrated for example in example 1 which follows. Monomers can be functionnalized before or after the polymerization with different linkers useful for peptide, bioorganic and organic chemistry, and the like.

Polymerization leads to a matrix that may be reduced to an alcohol functionality as illustrated in example 2 which follows. The later can react under basic conditions with a cyclic ether such as ethylene oxide, propylene oxide, and the like, or a cyclic amine, such as aziridines, and the like to give a PEG or PPG spacer arm between the vinyl and/or allyl scaffold and the terminal groups, as illustrated in example 3 which follows.

The present invention includes any polyether matrix obtained by desoxygenation of polyacrylates and/or polymethacrylates. The polyacrylates and/or polymethacrylates from U.S. Pat. No. 5,910,554 (Kempe et al., 1999 cf supra) and JP 60-147419 (Motozato, 1985 cf supra) can be chemically modified to give a polyether matrix by desoxygenation wherein ester bonds are converted to ether bonds. Desulfurization of thionoesters obtained by sulfurization of acrylate, methacrylate, maleate, itaconate, polyacrylate, polymethacrylate, polymaleate and/or polyitaconate, or of any ester or polyester is also included within the scope of the present invention.

According to the present invention, any acrylate, methacrylate, maleate and/or itaconate ester bond can be reduced to an aldehyde and/or alcohol functionality useful for anchoring linkers used in SPPS (solid phase peptide synthesis) and SPOS (solid phase organic synthesis). The presence of a ketone functionality in the polymer matrix resulting from the polymerization of vinyl ketones can also be used for anchoring SPPS and SPOS linkers. The end groups of the monomers may also contain alcohol, amino and/or phenyl groups that can be lately derivatized in (or with) useful linkers for peptide synthesis or bioorganic and organic chemistry. The present invention also includes that the ester can be transformed into carboxylic acid and acid chloride.

Contrary to all PEG and/or PPG based crosslinked polymers, except Meldal's polymers (Renil et al., 1996; Rademann et al., 1999 cf supra), where chemistry is performed on derivatized styrene (before or after the polymerization), the present invention promotes the elimination of polystyrene as core for the grafting of the PEG (and/or PPG) spacer arms. This aspect facilitates the use of the final matrix as solid support for gel-phase or solid-phase NMR (Nuclear Magnetic Resonance). Indeed, the absence of the aromatic counterpart gives a cleaner spectra than the one based on polystyrene-PEG matrix as observed by Meldal (Meldal et al., 2000 cf supra).

The cross-linked polymer according to the invention is designed in such a way that it is possible to modify its properties by an appropriate choice of monomers (including single monomer, secondary and tertiary crosslinkers). Indeed, the length of each monomer will affect the swelling of the final resin. That way, it is possible to obtain a resin with several mechanical and swelling behaviour. That feature is greatly helpful for the design of resins for continuous flow to batchwise synthesis. By using a longer monomer and/or crosslinker, the polymer is a more porous polymer enabling high molecular weight molecules penetration, which is effective for peptide, oligonucleotide, oligosaccharide synthesis and protein immobilization. Shorter monomers give a resin adapted for small molecule synthesis as found in current organic chemistry.

Furthermore, that physical aspect can be used for permeation chromatography where a porous matrix is essential. A harder resin will be useful for low to high pressure chromatography where a very small to no change in volume of the matrix is needed.

The chemical nature of the PEG and PPG gives to the polymer an exceptional versatility in most of organic and aqueous solvents. In organic synthesis and chromatography, low to high polarity solvents are often used in the same experiment. The amphiphile nature of the glycol derivatives according to the invention gives extraordinary swelling in solvents such as water, N,N-dimethylformamide, methanol, methylene chloride, ether, tetrahydrofuran, acetone, toluene and chemical families associated therewith.

The cross-linked polymer is obtained by suspension radical copolymerization of a mixture of acrylic and/or methacrylic, maleic and/or itaconic) acid derivative monomers with divinyl ketone (lately reduced to ether), divinyl or diallyl secondary and/or tertiary cross-linker, or a mixture thereof with a mono vinyl or allyl monomer. It will be noted that the secondary crosslinker could be substituted for a tertiary crosslinker as noted further.

The polyester matrix resulting from the copolymerization mentioned above is then chemically modified to a more chemically stable polyether matrix. The polyester polymer can already contain ether bonds from vinyl ether and/or allyl derivatives that will not be affected in the reduction reactions. The polyester may then be reduced to a polyallyl alcohol as described in example 2 which follows, that is then being transformed into the final polymer as described in example 3 which follows.

The polymer matrix according to the invention, based on the mixture of diallyl ether monomers with acrylates, methacrylates, maleates and/or itaconates, ultimately transformed into a polyallyl alcohol and then functionnalized with a PEG spacer arm, gives a most chemically stable polymer because of the nature of the primary ethers known to be used in more extreme conditions.

According to the invention, functional groups $Z_1$, $Z_2$ and $R_1$ to $R_{12}$ (including the terminal oxygen in alpha-position for $Z_1$) can be modified chemically before or after the copolymerization, into several types of linkers such as alcohol, alkylalcohol, amino, alkylamino, aryl, alkyl, aralkyl, cyano, carboxyl, ester, mercapto, sulfo, sulfino, sulfeno in any derivatives thereof or in any protected form. Furthermore, any already designed linker for organic, peptide, nucleotide and saccharide synthesis can be attached to the monomer (as $Z_1$, $Z_2$ and/or $R_1$ to $R_{12}$) or by any functionality described above as a spacer.

These linkers can be used for organic, peptide, protein, nucleotide and saccharide synthesis. They can also be used also for the immobilisation of protein and reagents or for chromatographic and scavenging purposes. End-capped monomers (such as alkyl and aryl in place of $Z_1$, $Z_2$ and/or $R_1$ to $R_{12}$) can be used as chromatographic devices as reversed-phase packing. Other polar functionality for the $Z_1$, $Z_2$ and/or $R_1$ to $R_{12}$ such as $SO_3H$ and $NH_2$ can be used in ion exchange and normal phase chromatography.

According to the present invention, it is possible to use other polymerizable monomers in the copolymerization leading to the polymer according to the present invention.

The polymer can be generated into a preferred beaded (spherical) form by processes such as normal and inverse suspension, emulsion, dispersion, seeded or precipitation polymerizations. Normal and/or inverse suspension polymerization is the preferred method for the production of beads according to the present invention.

Bulk and solution polymerization should normally be avoided because no beads are thus formed. Nevertheless, powders obtained directly or by grinding and sieving of the bulk polymer and/or any other solid form of the polymer can be obtained by theses two processes and can be employed as solid support in the applications listed above.

Radical initiated polymerization is the standard way by which vinyl monomers are polymerized although other methods can be used according to the present invention.

According to the present invention, vinyl, vinyl ether and/or allyl monomers may for example be copolymerized by radical polymerization where vinyl ether and allyl compounds are known to copolymerize easily in the presence of other vinyl compounds such as acrylic, methacrylic acids and/or esters and/or derivatives.

The polymerization is normally initiated by products that upon heating, ultraviolet and/or gamma radiation give free radicals. In the present invention organic peroxides such as benzoyl and lauroyl peroxides are preferred. Heating the reaction mixture is the preferred way to form these free radicals.

The invention will now be illustrated by means of the following non limiting examples.

EXAMPLES

Example 1

Synthesis of the Polymethacrylate Resin (TEGDVE-EMA)

Monomer Phase:
EMA (Ethyl methacrylate) (24.9 mL; 22.83 g; 200 mmol)
TEGDVE (Trietylene glycol divinyl ether) (20.43 mL; 20.23 g, 100 mmol)
LP (Lauroyl peroxide) (250 mg; 0.63 mmol)

Aqueous Phase:
Solution of 1% PVA (88% hydrolyzed) in distilled water (700 mL)

Solvents for the Work-Up:
Distilled water (500 mL)
THF (500 mL)
Methanol (500 mL)
Diethyl ether (200 mL)

Procedure:
In a 1 L tri neck flask under dry nitrogen, 7 g of polyvinyl alcohol are dissolved in 700 mL of hot distilled water at 500 r.p.m. The temperature is lowered to 25° C. before the addition of the monomer phase.

In a separate 125 mL Erlenmeyer flask under agitation, the monomer phase is prepared by mixing the EMA, the LP and the TEGDVE. When the monomer phase is then poured into the aqueous phase containing the suspending agents and equilibrate for 1 h before heating. The polymerization is realized by heating the suspension during 6 h a 70° C. After 6 h, the suspension is filtered on a Büchner funnel. The resin is then washed with hot distillated water (4×1 L), THF (2×250 mL), methanol (2×250 mL) and diethyl ether (2×100 mL). The resin is dried at 40° C. under vacuum overnight.

Obtained weight: 37.03 g
Yield: 86%

Example 2

Reduction of the Polymethacrylate from Example 1 to the Polyol Resin

Polymer from example 1 (17 g; 78.2 mmol of ester groups)
LiAlH$_4$ 1M/THF (78.2 mL; 78.2 mmol)
THF (600 mL)

Solvents for the Work-Up:
HCl 2N (750 mL)
Distilled water (500 mL)
THF (500 mL)
Methanol (500 mL)
Diethyl ether (500 mL)

Procedure:

In a 500 mL flask under dry nitrogen, the polymethacrylate resin from Example 1 was swelled in THF with vigorous mechanical agitation. The LiAlH$_4$ solution was added carefully by the mean of syringe. After refluxing during 24 h, the suspension is poured gradually in 250 mL of HCl 2N (evolution of hydrogen and heat) and filtered on a Büchner funnel. The resin is rinsed with HCl 2N, distilled water, THF/water (2/1), THF, methanol and diethyl ether (2×250 mL each). The resin is dried at 40° C. under vacuum overnight.

| Theo. weight (g) | Exp. weight (g) | Yield (%) | Theo. loading* | Theo. derivatized loading | Exp. derivatized loading** |
|---|---|---|---|---|---|
| 13.60 | 11.76 | 86 | 5.70 | 3.4 | 4.16*** |

*Based on the EMA/TEGDVE molar ratio of the monomer phase.
**In mmol/g, based on the phenyl carbamate derivative (Parker et al., 1997).
***Show that the "real" theoretical loading is approximatively 8.25 mmol/g due to the different molar ratio of the EMA/TEGDVE in the final polymer.

Example 3

Homologation of the Polyol Resin by Ethylene Oxide

Reagents:
Polyol from example 2 (5.67 g; 46.8 mmol)
t-BuO$^-$K$^+$1M/THF (46.8 mL; 46.8 mmol)
Ethylene oxide (49,6 g; 56 mL; 1126 mmol)
THF (750 mL)

Solvents for the Work-Up:
THF (250 mL)
Distilled water (250 mL)
Methanol (100 mL)
Diethyl ether (100 mL)

Procedure:

In a 2 L Parr pressure reactor (under dry nitrogen), the polyol resin from example 2 was swelled in 650 mL of THF. The solution of t-BuO$^-$K$^+$ was added to the suspension and stirred overnight at 25° C. A solution of ethylene oxide in 100 mL of THF is then poured into the reactor. After 8 h of mechanical shaking at 75° C., the suspension is filtered on a Büchner funnel. The resin is rinsed with THF, water, methanol and diethyl ether. The resin is dried at 40° C. under vacuum overnight.

Weight obtained: 24.0 g

| Resin type | % C | % N | Loading (mmol/g)* | MW PEG |
|---|---|---|---|---|
| Polyol resin from example 2 | 61.4 | — | — | — |
| Polyol resin from example 2 carbamate derivatized | 66.1 | 5.82 | 4.16 (8.24 real) | — |
| Polyol resin from example 3 | 55.3 | — | — | — |
| Polyol resin from example 3 carbamate derivatized | 58.0 | 2.07 | 1.48 (1.80 real) | 434 (78% w/w PEG) |

*In mmol/g, based on the phenyl carbamate derivative (Park et al., 1997)

REFERENCES

1. Ammunziata, R.; Benaglia, M.; Cinquini, M.; Cozzi, F. and Pitillo, M., (2001), J. Org. Chem., 66, 3160–3166.
2. Arshady, R., Atherton, E., Clive, D. L. J. and Sheppard, R. C., (1981), J. Chem. Soc. Perkin Trans., 529–537.
3. Atherton, E., Brown, E. and Sheppard, R. C., (1981), J. Chem. Soc. Chem. Commun., 1151–1152.
4. Bayer, E. and Capp, W. (1990) U.S. Pat. No. 4,908,405.
5. Bayer, E. (1991) Angew. Chem. Int. Ed. Engl. 30, 113–129.
6. Bevington, J. C.; Huckerby, T. N.; Hunt, B. J. and Jenkins, A. B., (2001), J. Macromol. Sci. Pure Appl. Chem. A38 (7), 627–640.
7. Buchardt, J. and Meldal, M., (1998), Tetrahedron Lett., 39, 8695–8698.
8. Groth, T.; Grotli, M.; Lubell, W. D.; Miranda, L. P. and Meldal, M., (2000), J. Chem. Soc. Perkin Trans. 1, 4258–4264.
9. Hendrana, S.; Hill, D. J. T.; Senake Perera, M. C. and Pomery, P. J., (2001), Polym. Int. (50), 597–605.
10. Hellerman, H., Lucas, H. W., Maul, J., Pillai, V. N. R. and Mutter, M., (1983), Makromol Chem., 184, 2603.
11. Janda, K. D. (1999), Tetrahedron Lett., 40, 6329.
12. Kanda, P., Kennedy, R. C. and Sparrow, J. T., (1991), Int. J. Peptide Protein Res., 38, 385–391.
13. Kempe, M. and Barany, G., (1996), *J. Am. Chem Soc.*, 118, 7083–7093.
14. Kempe, M. and Barany, G., (1999) U.S. Pat. No. 5,910,554.
15. Labadie, J. W.; Porco, J. A. and Gooding O. W., WO 97/27226.
16. Lee, Y.-S.; Park, B.-D. and Lee, H.-L., (1995) U.S. Pat. No. 5,466,758.
17. Meldal, M., (1992), Tetrahedron Lett., 33, 3077–3080.
18. Meldal, M., (1994), U.S. Pat. No. 5,352,756.
19. Meldal, M., (1997), Methods in enzymology, 289, 83–104, Academic Press, N.Y.
20. Meldal, M., Buchardt, J. and Rademann, J., (2000), WO 00/18823.
21. Merrifield, R. B. (1963), J. Am. Chem. Soc., 85, 2149–2153.
22. Milstein, N., (1968), J. Heterocycl. Chem., 5, 337–338.
23. Motozato, Yoshiaki (1985) Japanese Pat. 60-147419.
24. Moustafa, A. B. and Faizalla, A., (1999) J. Applied Polymer Science, 73, 149–159.
25. Nakajima, T.; Suga, S.; Sugita, T. and Ichikawa, K., (1969). Tetrahedron, 25, 1807–1816.
26. Park B.-D.; Lee, H-I.; Ryoo, S.-J. and Lee, Y.-S., (1997), Tetrahedron Lett., 38, 591–594.
27. Rademann, J., Grotli, M., Meldal, M. and Bock, K., (1999), J. Am. Chem. Soc., 121, 5459–5466.

28. Renil, M., Nagari, R. and Pillai, V. N. R., (1994), Tetrahedron, 50, 6681.
29. Renil, M. and Meldal, M., (1995), Tetrahedron Lett., 36, 4647–4650.
30. Renil, M. and Meldal, M., (1996), Tetrahedron Lett., 37, 6185–6188.
31. Roice, M., Kumer, K. S. and Pillai, V. N. R., (1999), Macromol., 32, 8807–8815.
32. Small, P. W. and Sherrington, D. C., (1989), J. Chem. Soc. Chem. Commun., 1589–1591.
33. Tuncel, A., (2000), Colloid Polym. Sci., 278, 1126–1138.
34. Varkey, J. T. and Pillai, V. N. R., J. Peptide Res., (1998), 51, 49.
35. Wentworth, P. and Janda, K. D. (1999), Chem. Commun., 1917–1924.
36. Wilson, M. E., Paech, K., Zhou, W.-J. and Kurth, M. J., (1998), J. Org. Chem., 63, 5094–5099.
37. Zalipsky, S., Chang, J. L., Albericio, F. and Barany, G., (1994), React. Polym., 22, 243.

The invention claimed is:

1. A cross-linked polyether derived from a cross-linked polyester, said cross-linked polyether is obtained by:
   i) copolymerizing at least one monomer derivative of an acrylic, methacrylic, maleic and/or itaconic acid with (a) at least one cross-linker having at least two polymerizable terminal end groups, with the exception of epoxy and oxetane end groups, or (b) divinyl benzene to produce the cross-linked polyester;
   ii) reducing said cross-linked polyester of step i) to give a cross-linked polyol resin; and
   iii) reacting said cross-linked polyol resin of step ii) with a cyclic ether or a cyclic amine to give said cross-linked polyether.

2. Cross-linked polyether according to claim 1, wherein said cross-linker comprises a PEG or PPG based polymer.

3. Cross-linked polyether according to claim 2, wherein said cross-linker comprises a PEG diallyl ether.

4. Cross-linked polyether according to claim 2, wherein said cross-linker comprises a PEG divinyl ether.

5. Cross-linked polyether according to claim 1, wherein said cross-linker comprises divinyl benzene.

6. A method for the preparation of a cross-linked polyether, the method comprising:
   i) copolymerizing at least one monomer derivative of an acrylic, methacrylic, maleic and/or itaconic acid with (a) at least one cross-linker having at least two polymerizable terminal end groups, with the exception of epoxy and oxetane end groups, or (b) divinyl benzene to produce a cross-linked polyester, and
   ii) converting said cross-linked polyester into a cross-linked polyether.

7. Method according to claim 6, wherein step ii) comprises reducing said cross-linked polyester to give a cross-linked polyol resin, and reacting said cross-linked polyol resin with a cyclic ether or a cyclic amine to give said cross-linked polyether.

8. Method according to claim 6, which comprises reducing said cross-linked polyester to give a cross-linked polyol and treating said cross-linked polyol by homologation to give said cross-linked polyether.

9. Method according to claim 8, wherein said homologation comprises reacting the cross-linked polyol with a cyclic ether or amine under basic conditions to give the cross-linked polyether.

10. Method according to claim 9, wherein said homologation comprises reacting the cross-linked polyol with a cyclic ether selected from the group consisting of ethylene oxide and propylene oxide.

11. Method according to claim 9, which comprises reacting the cross-linked polyol with a cyclic amine selected from aziridines.

12. Method according to claim 6, wherein said cross-linked polyester is obtained by suspension radical polymerization.

13. Method according to claim 6, which comprises synthesizing the cross-linked polyester into beaded form, which will then be converted into polyether.

14. Method according to claim 13, which comprises forming said beads by normal and/or inverse suspension.

* * * * *